C. G. PAGE & R. J. FALCONER.
FORMING LINES OF PIPES.
No. 26,517. Patented Dec. 20, 1859.
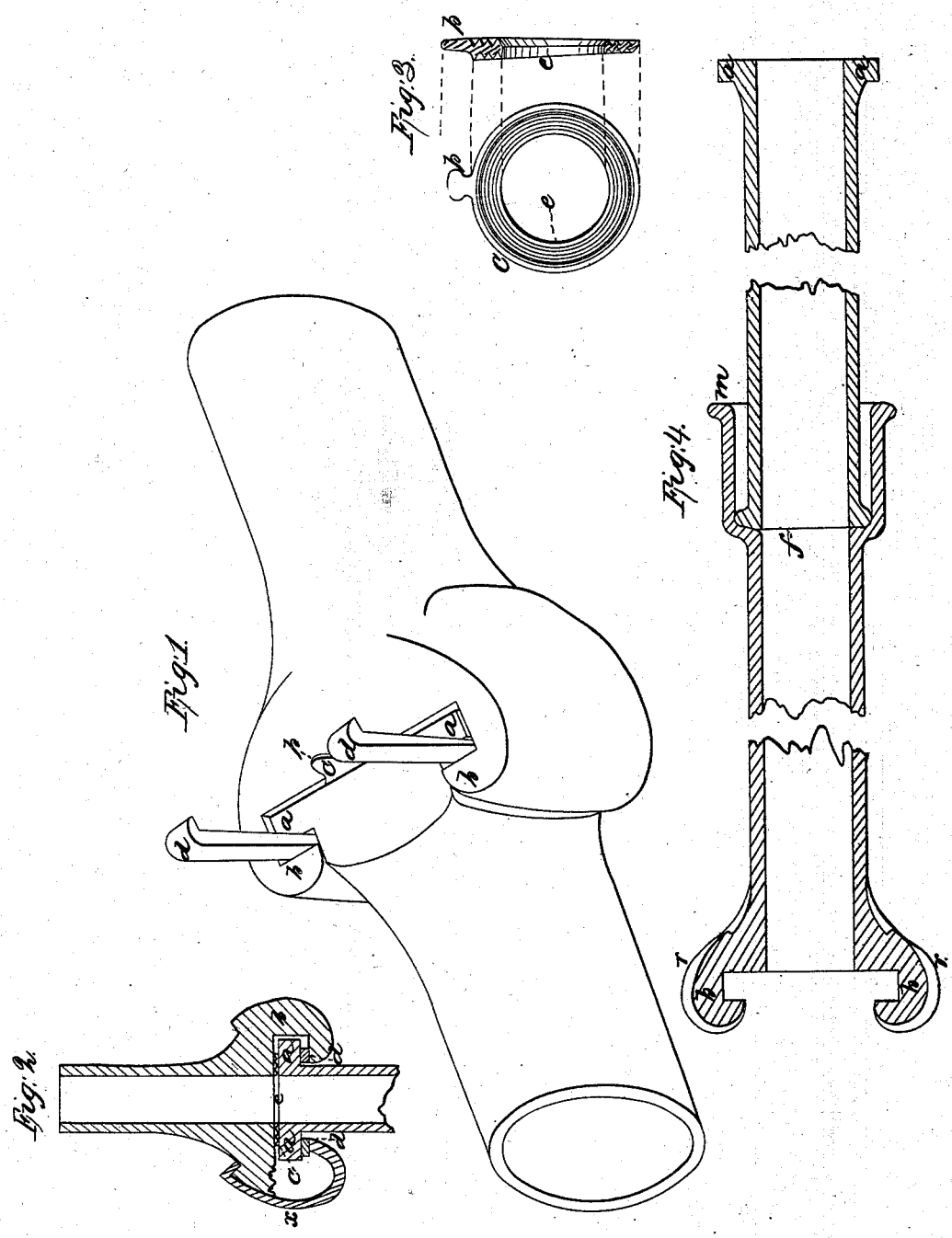

UNITED STATES PATENT OFFICE.

CHARLES G. PAGE AND RALPH I. FALCONER, OF WASHINGTON, DISTRICT OF COLUMBIA.

PIPE-COUPLING.

Specification of Letters Patent No. 26,517, dated December 20, 1859.

*To all whom it may concern:*

Be it known that we, CHARLES G. PAGE and RALPH I. FALCONER, both of Washington, in the county of Washington and District of Columbia, have invented an improvement upon the coupling for which Letters Patent were granted to the above-named Ralph I. Falconer on the 7th day of June, 1853, and that the following is a full, clear, and exact description of the principle or character which distinguishes it from all other things before known and of the usual manner of making, modifying, and using the same, reference being had to the accompanying drawings, of which—

Figure 1 represents a perspective view of the improved coupling, Fig. 2 a section through a broken coupling and Fig. 3 the packing shown in plan and section.

Our invention consists in an improvement upon the slide coupling for which Letters Patent were granted to R. I. Falconer June 7th, 1853, described and represented as follows: Instead of making the male and female parts or sections of the coupling to draw, or in other words instead of making the coupling water tight by means of the oblique or wedge shaped form of the flanges of these two parts, we make the flanges straight so that the male part or section $a$ will enter freely and leave some space between it and the face of the female section $b$. When the sections have been entered we insert between their flanges keys or wedges $d, d$, so as to set up and tighten the sections having previously placed a washer $c$ between the faces of the two sections.

The Falconer coupling requires a high finish to prevent leakage and also requires some attention to secure the perfect matching of its two sections so that their central openings shall exactly correspond and leave no breaks to resist the flow of water. By entering the sections first and matching them and then setting up by and endwise movement all such difficulties are avoided and we are enabled to make a water tight joint with rough castings or without any finish to the faces of the two sections, while we have the full benefit of the side or slide coupling over what are called end couplings. There are several advantages due to the side and slide coupling joint but the chief advantage is in the facility of making the joint when the water is rushing through the line of pipe or hose and it is obvious that other mechanical means than the wedges may be used to set up the sections without changing the character or principle of the improvement.

What we claim therefore as our improvement upon the Falconer coupling is—

Combining with the lateral or transverse movement of the male and female sections $a, b$, an endwise movement to effect the tightening of said sections as herein set forth.

CHAS. G. PAGE.
R. I. FALCONER.

Witnesses:
T. CAMPBELL,
A. SELDEN.